(12) United States Patent
Lan et al.

(10) Patent No.: US 11,507,207 B2
(45) Date of Patent: Nov. 22, 2022

(54) MULTIFUNCTIONAL STYLUS AND TOUCH DEVICE

(71) Applicant: G-YOUTH TECHNOLOGIES (SHENZHEN) CO. LTD, Shenzhen (CN)

(72) Inventors: Rongqin Lan, Dongguan (CN); Min Fan, Dongguan (CN); Yun Feng, Dongguan (CN)

(73) Assignee: G-YOUTH TECHNOLOGIES (SHENZHEN) CO. LTD, Shenzhen (CN)

(*) Notice: Subject to any disclaimer, the term of this patent is extended or adjusted under 35 U.S.C. 154(b) by 213 days.

(21) Appl. No.: 16/906,602

(22) Filed: Jun. 19, 2020

(65) Prior Publication Data

US 2021/0286451 A1    Sep. 16, 2021

(30) Foreign Application Priority Data

Mar. 10, 2020  (CN) .......................... 202010161700.4

(51) Int. Cl.
*G06F 3/0354*    (2013.01)
*H02J 7/00*      (2006.01)
*H04R 1/10*      (2006.01)

(52) U.S. Cl.
CPC ........ *G06F 3/03545* (2013.01); *H02J 7/0045* (2013.01); *H04R 1/1016* (2013.01); *H04R 1/1025* (2013.01); *H04R 1/1041* (2013.01); *H04R 2420/07* (2013.01)

(58) Field of Classification Search
CPC .......................... G06F 3/03545; G06F 3/04162
See application file for complete search history.

(56) References Cited

U.S. PATENT DOCUMENTS

| 2011/0215914 | A1* | 9/2011 | Edwards | G06F 3/041 |
| | | | | 345/173 |
| 2015/0049065 | A1* | 2/2015 | Chen | G06F 1/1684 |
| | | | | 345/179 |
| 2015/0256010 | A1* | 9/2015 | Scandurra | H02J 7/0044 |
| | | | | 320/107 |
| 2016/0056648 | A1* | 2/2016 | Dowd | H02J 7/0042 |
| | | | | 320/107 |

FOREIGN PATENT DOCUMENTS

| CN | 206086081 U | 4/2017 |
| CN | 206833386 U | 1/2018 |

* cited by examiner

*Primary Examiner* — Kevin M Nguyen
(74) *Attorney, Agent, or Firm* — Birch, Stewart, Kolasch & Birch, LLP

(57) ABSTRACT

Disclosed are a multifunctional stylus and a touch device. The multifunctional stylus includes a main structure, a charging assembly and a stylus tip. The main structure has an accommodating cavity therein, a first end of the main structure has a charging compartment recessed inwards and a charging electrode is disposed in the charging compartment. The charging assembly is located in the accommodating cavity, and the charging assembly is in electrical contact with the charging electrode to provide electrical energy for the charging electrode. The stylus tip is fixedly connected to a second end of the main structure. Both the multifunctional stylus and the touch device provided by the present disclosure have more functions and a higher utilization rate.

18 Claims, 9 Drawing Sheets

MULTIFUNCTIONAL STYLUS AND TOUCH DEVICE

CROSS-REFERENCE TO RELATED APPLICATION

This application claims priority to a Chinese patent application No. 202010161700.4 filed on Mar. 10, 2020, disclosure of which is incorporated herein by reference in its entirety.

TECHNICAL FIELD

The present disclosure relates to a technical field of stylus application and, in particular, to a multifunctional stylus and a touch device.

BACKGROUND

To facilitate touch operation, touch mobile terminals such as mobile phones, televisions or tablet computers are usually each equipped with a capacitive pen.

In the related art, the head of a penholder of the capacitive pen is provided with a stylus tip for touching on a touch mobile terminal, and the middle or tail of the penholder is usually provided with a function button for controlling a function of the stylus tip, such as turning on the writing function or the eraser function of the stylus tip. However, the penholder of the capacitive pen has less functions, resulting in a lower utilization rate of the capacitive pen.

SUMMARY

The present disclosure provides a multifunctional stylus and a touch device with more functions and a higher utilization rate.

As conceived above, the present disclosure has technical solutions as below.

The present disclosure provides a multifunctional stylus, which includes a main structure, a charging assembly and a stylus tip. An accommodating cavity is disposed in the main structure, a first end of the main structure has a charging compartment recessed inwards and a charging electrode is disposed in the charging compartment. The charging assembly is located in the accommodating cavity, and the charging assembly is in electrical contact with the charging electrode to provide electrical energy for the charging electrode.

Optionally, the charging electrode has a contact portion, and the contact portion passes through a via hole on a sidewall of the main structure to enter the charging compartment.

Optionally, the charging electrode includes a first connection portion and at least one bent portion that is in electrical contact with the first connection portion, one end of the first connection portion is in electrical contact with the charging assembly, and an end of each of the at least one bent portion has the contact portion.

Optionally, the charging electrode includes a first power terminal and a second power terminal which are electrically opposite, the second power terminal includes a second connection portion and an annular portion connected to each other, the second connection portion is in electrical contact with the charging assembly, the annular portion is located in the charging compartment, one end of the first power terminal is in electrical contact with the charging assembly, and the other end of the first power terminal is located in the charging compartment.

Optionally, the multifunctional stylus further includes a magnetic member fixed in the main structure, and the magnetic member is configured to attract and fix an electronic device located in the charging compartment.

Optionally, the accommodating cavity and the charging compartment are separated by a partition, and the magnetic member is fixed to the partition.

Optionally, the main structure has at least one fixing hole, and an attraction member is disposed in each of the at least one fixing hole to attract and fix the multifunctional stylus to an object in contact with the multifunctional stylus.

Optionally, the charging assembly includes a rechargeable battery, a motherboard connected to the rechargeable battery, and a charging interface connected to the motherboard. The charging interface is exposed outside the multifunctional stylus.

Optionally, the charging interface is fixed to the main structure; or a raised structure is fixed to the main structure, a button is disposed on the raised structure and the charging interface is fixed to the raised structure.

Optionally, the multifunctional stylus further includes an end cover detachably connected to the first end and configured to cover the charging compartment.

Optionally, the multifunctional stylus further includes a casing sleeved outside the main structure.

The present disclosure further provides a touch device. The touch device includes a Bluetooth earphone and the above-described multifunctional stylus, and the Bluetooth earphone is located in the charging compartment of the multifunctional stylus.

Optionally, a charging contact of the Bluetooth earphone is located on an outer lateral surface or an end surface of the Bluetooth earphone.

Optionally, the touch device includes two Bluetooth earphones, and the two Bluetooth earphones are in contact along a length direction of the multifunctional stylus.

Optionally, the touch device includes two Bluetooth earphones, the two Bluetooth earphones are magnetically attracted together, and a force of attraction between the two Bluetooth earphones is greater than a force of attraction of the two Bluetooth earphones to the charging compartment.

The present disclosure has the beneficial effects as below.

The multifunctional stylus provided by present disclosure has a stylus tip for touch control at one end, a charging assembly capable of charging an electronic device at the other end, and a charging compartment capable of accommodating the electronic device. Thus, the multifunctional stylus not only has the function of touch control, but also has the function of charging an electronic device, so that the electronic device can be placed in the charging compartment in the multifunctional stylus when not in use, thereby reducing the risk of losing the electronic device, facilitating the charging of the electronic device, enriching the functions of the multifunctional stylus, improving the utilization rate of the multifunctional stylus, and thus increasing the utilization value of the multifunctional stylus.

In addition, the multifunctional stylus can fix the electronic device in the charging compartment by means of magnetic attraction so that the electronic device can be more stable, and it is convenient for the electronic device to be taken out of the charging compartment.

The touch device provided by present disclosure not only has the function of touch control, but also has the function of charging a Bluetooth earphone, so that a Bluetooth earphone can be placed in the charging compartment in the multifunctional stylus when not in use, thereby reducing the risk of losing the Bluetooth earphone, enriching the func-

Figure 1:
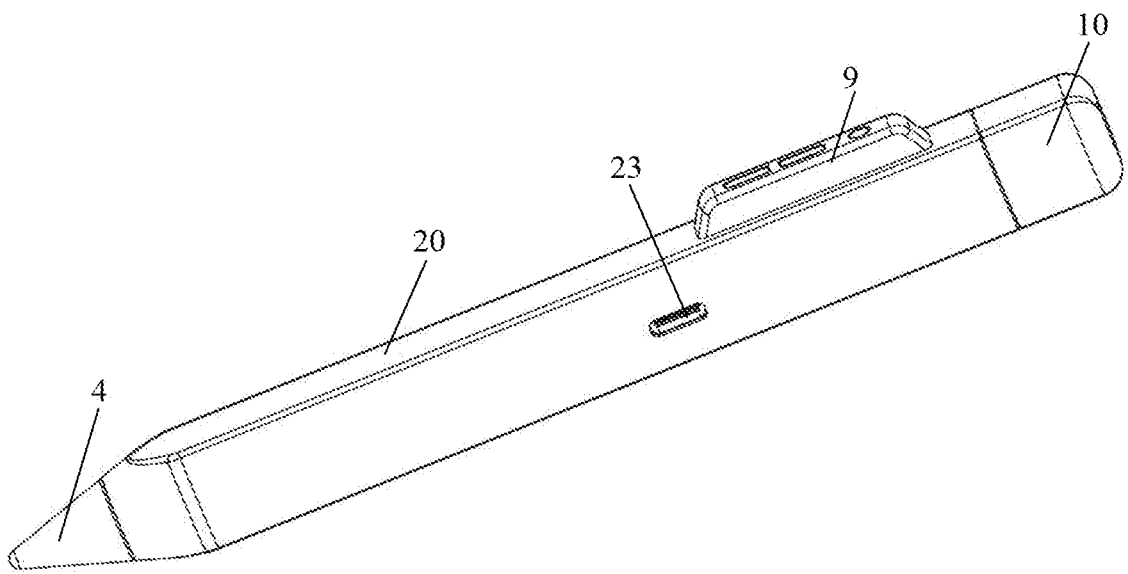
FIG. 1 is a structure view of a multifunctional stylus according to an embodiment of the present disclosure.

In the figures: 1—main structure; 11—charging compartment; 12—accommodating cavity; 13—partition; 14—first cylinder; 141—third through hole; 15—second cylinder; 151—step structure; 152—accommodating groove; 2—charging assembly; 21—rechargeable battery; 22—motherboard; 23—charging interface; 3—Bluetooth earphone; 31—earphone body; 32—charging contact; 33—first portion; 34—second portion; 4—stylus tip; 5—charging electrode; 50—contact portion; 51—first connection portion; 52—bent portion; 61—first power terminal; 62—second power terminal; 621—second connection portion; 622—annular portion; 7—magnetic member; 8—attraction member; 9—raised structure; 10—end cover; 20—casing; 100—via hole; 201—first through hole; 202—magnetic attraction plane; 203—second through hole; 301—first button; and 302—second button

DETAILED DESCRIPTION

To make the solved technical problems, the adopted technical solutions and the achieved technical effects in the present disclosure clearer, the technical solutions of the present disclosure will be further described below with reference to the drawings and embodiment. It should be understood that the embodiment described here are only used for explaining the present disclosure, rather than limiting the present disclosure. In addition, it should be noted that, to facilitate description, the drawings show only part, not all, related to the present disclosure.

In the description of the present disclosure, it should be noted that orientations or position relations indicated by terms "center", "upper", "lower", "left", "right", "vertical", "horizontal", "in", "out" and the like are orientations or position relations based on the drawings. These orientations or position relations are only for the convenience of describing the present disclosure and simplifying the description, and do not indicate or imply that a device or element referred to must have such specific orientations, or be configured or operated in such specific orientations. Thus, these orientations or position relations shall not be construed as limiting the present disclosure. In addition, terms "first", "second" and the like are used for the purpose of description, and shall not be construed as indicating or implying relative importance.

In the description of the present disclosure, it should also be noted that terms "mounted", "joined" and "connected" shall be understood in a broad sense unless otherwise expressly specified and limited. For example, the term "connected" may refer to "fixedly connected" or "detachably connected". In addition, the term "connected" may refer to "mechanically connected" or "electrically connected". Further, the term "connected" may refer to "connected directly", "connected indirectly through an intermediary" or "communicated in two components". For those of ordinary skill in the art, specific meanings of the above terms in the present disclosure may be understood according to specific situations.

This embodiment provides a multifunctional stylus, which is capable of charging an electronic device (such as a Bluetooth earphone 3) and has a higher utilization rate.

As shown in FIGS. 1 to 14, the multifunctional stylus includes a main structure 1, a charging assembly 2 and a stylus tip 4.

The main structure 1 is a hollow cylinder with an accommodating cavity 12 therein. The charging assembly 2 is located in the accommodating cavity 12. The main structure 1 has opposite first and second ends, the first end has a charging compartment 11 recessed inwards, and the charging compartment 11 is configured to accommodate an electronic device. Specifically, the charging compartment 11 can magnetically fix the electronic device. A charging electrode 5 for charging the electronic device is disposed in the charging compartment 11 so that the multifunctional stylus can charge the electronic device while accommodating it. The stylus tip 4 is fixedly connected to the second end of the main structure 1, and the stylus tip 4 can be used to input commands to a computer, communication and consumer (3C) device with a touch screen, such as a computer screen, a mobile device or a drawing board, to perform operations such as file selection, drawing and writing.

The multifunctional stylus provided in this embodiment has a stylus tip 4 for touch control at one end, a charging assembly 2 capable of charging an electronic device at the other end, and a charging compartment 11 capable of accommodating the electronic device. Thus, the multifunctional stylus not only has the function of touch control, but also has the function of charging an electronic device, so that the electronic device (a Bluetooth earphone 3) can be placed in the charging compartment 11 in the multifunctional stylus when not in use, thereby reducing the risk of losing the electronic device, facilitating the charging of the electronic device, enriching the functions of the multifunctional stylus, improving the utilization rate of the multifunctional stylus, and thus increasing the utilization value of the multifunctional stylus.

Figure 7:
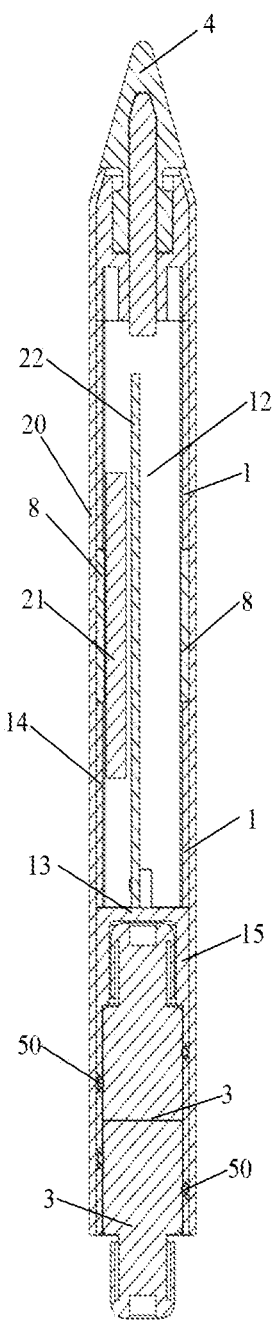
FIG. 7 is a cross-sectional view taken along a line A-A shown in FIG. 6 according to the embodiment of the present disclosure.
Figure 8:
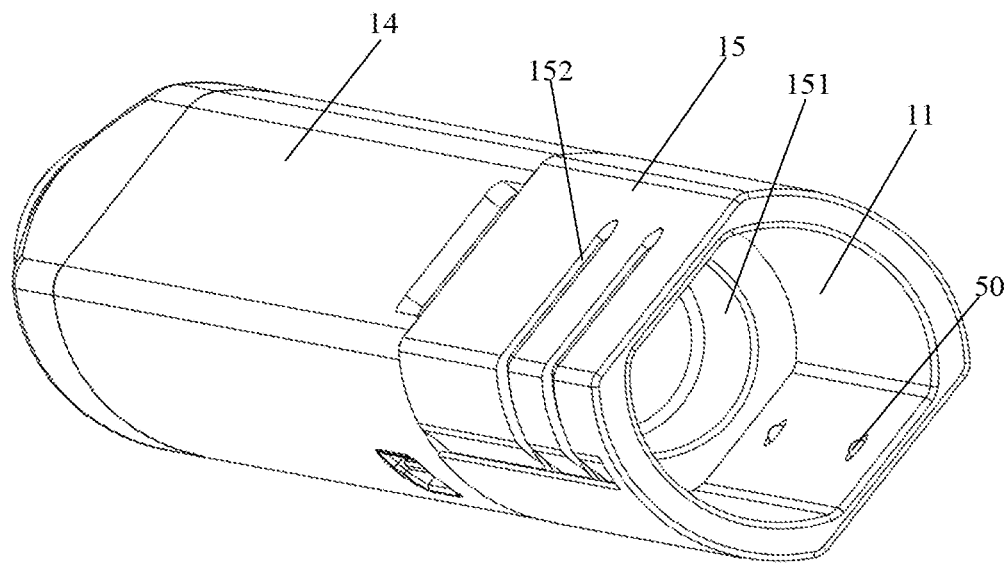
FIG. 8 is a structure view of a main structure of the multi-function stylus according to the embodiment of the present disclosure.

Optionally, as shown in FIGS. 7 and 8, the accommodating cavity 12 in the main structure 1 and the charging compartment 11 at the first end of the main structure 1 may be separated by a partition 13.

Figure 3:
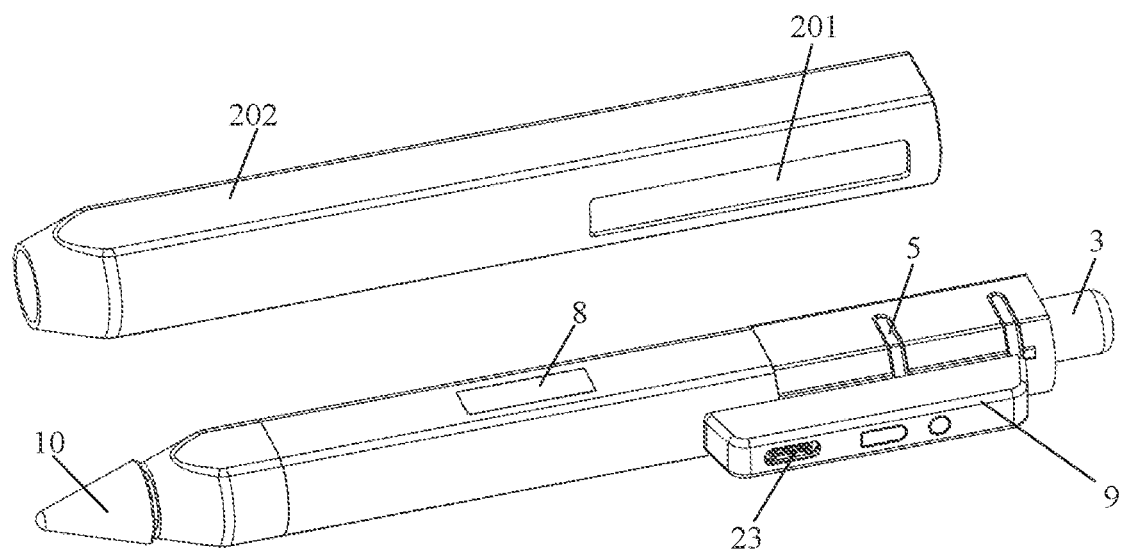
FIG. 3 is a first exploded view of another multifunctional stylus according to the embodiment of the present disclosure.
Figure 4:
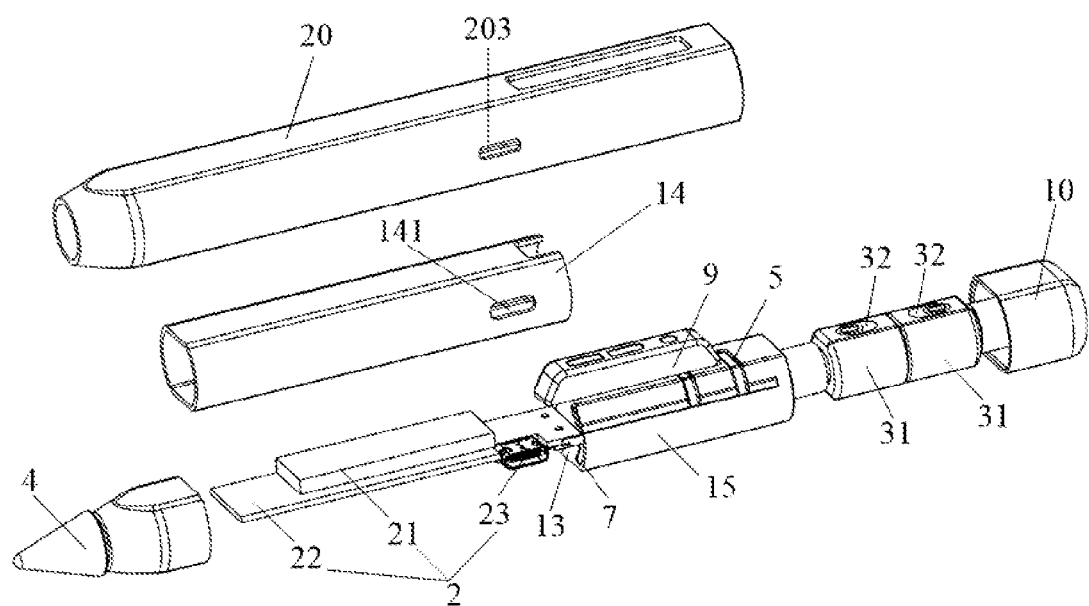
FIG. 4 is a second exploded view of the multifunctional stylus according to the embodiment of the present disclosure.

Further, as shown in FIGS. 3 and 4, the main structure 1 may include a first cylinder 14, a second cylinder 15 and the partition 13 between the first cylinder 14 and the second cylinder 15 (i.e., the partition 13 that separates the accommodating chamber 12 and the charging compartment 11). The second cylinder 15 and the partition 13 form the charging compartment 11 for accommodating an electronic device, and the first cylinder 14 forms the above-described accommodating cavity 12.

In this embodiment, with reference to FIG. 8, one end of the second cylinder 15 has a stepped structure 151. The stepped structure 151 is configured to support and position an electronic device (such as a Bluetooth earphone 3) so that the electronic device can be located in the charging compartment 11 stably.

In this embodiment, the charging electrode 5 may have various structures. This embodiment provides two types of charging electrodes 5 described below.

Figure 9:
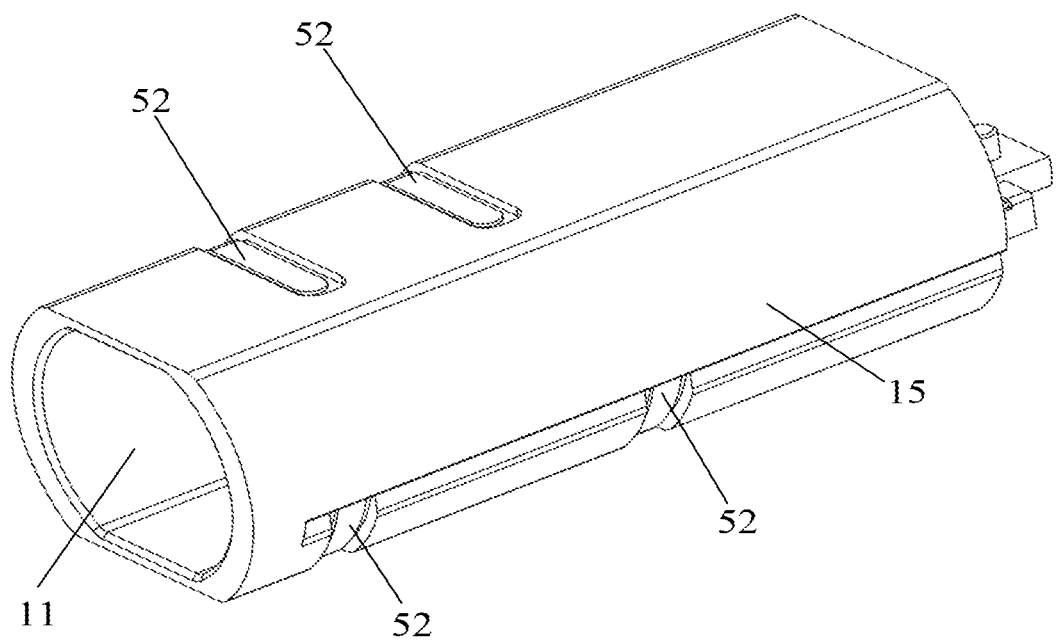
FIG. 9 is a structure view showing the assembly of a second cylinder and a charging electrode according to the embodiment of the present disclosure.
Figure 10:
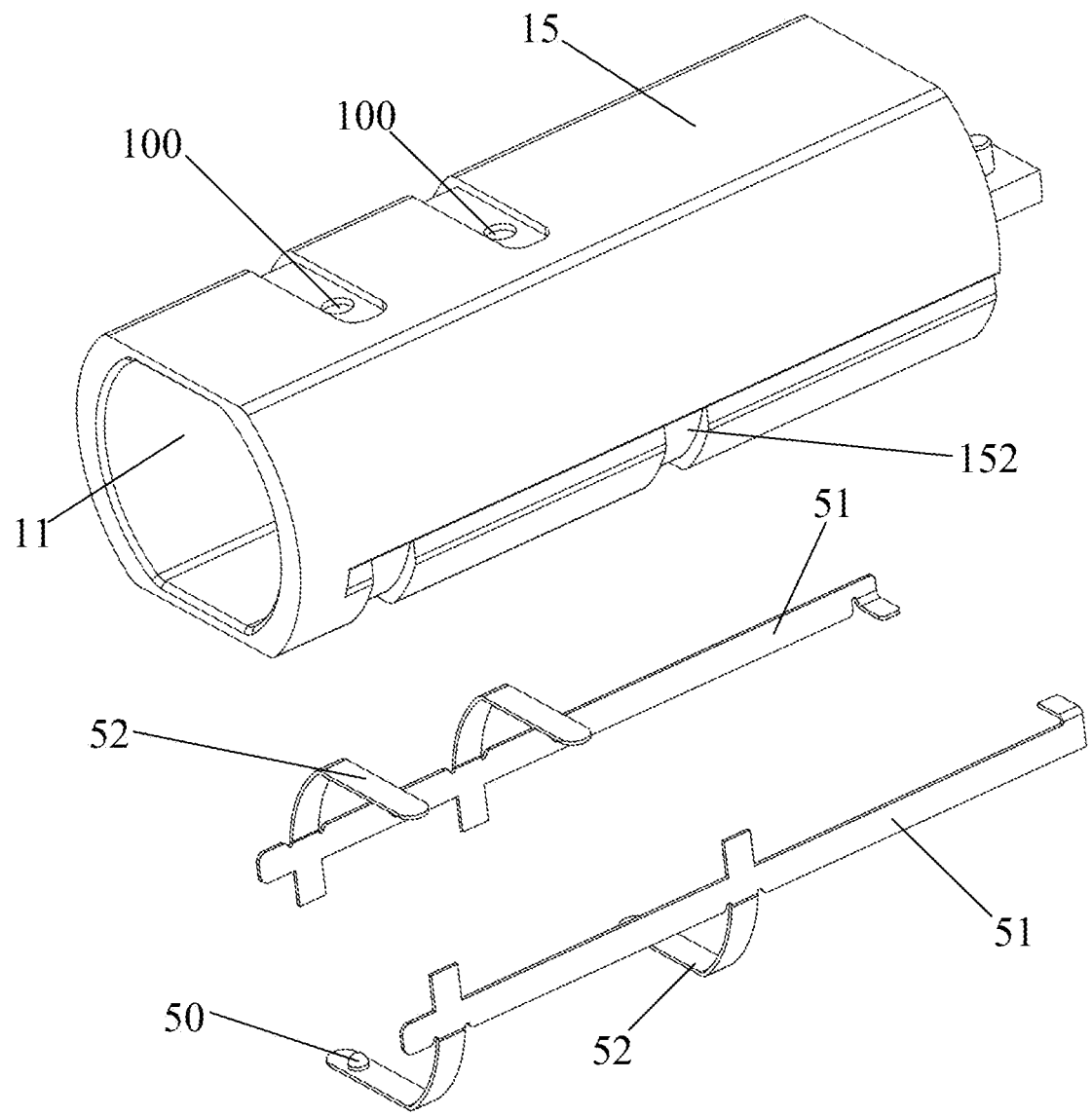
FIG. 10 is an exploded view of the structure in FIG. 9 according to the embodiment of the present disclosure.

In the structure of the first type of charging electrode 5, the charging electrode 5 has a sheet shape. One end of the charging electrode 5 is in electrical contact with the charging assembly 2, and the other end of the charging electrode 5 is located in the charging compartment 11, as shown in FIGS. 4 and 10. Specifically, as shown in FIGS. 9 and 10, a via hole 100 through which the other end of the charging electrode 5 passes is disposed on a portion of a sidewall of the main structure 1 located in the charging compartment 11 (that is, a sidewall of the second cylinder 15), and the other end of the charging electrode 5 has a contact portion 50 that can pass through the above-described via hole 100. The contact portion 50 can pass through the above-described via hole 100 on the sidewall of the second cylinder 15 to enter the charging compartment so as to charge an electronic device. Exemplarily, as shown in FIG. 8, the contact portion 50 may have a spherical shape so that the charging electrode 5 can be prevented from scratching the contact on the electronic device when the charging electrode 5 is in contact with the electronic device.

Optionally, the multifunctional stylus may have two charging electrodes 5, and these two charging electrodes 5 are in electrical contact with positive and negative electrodes of the charging assembly 2, respectively, to form a loop.

Figure 5:
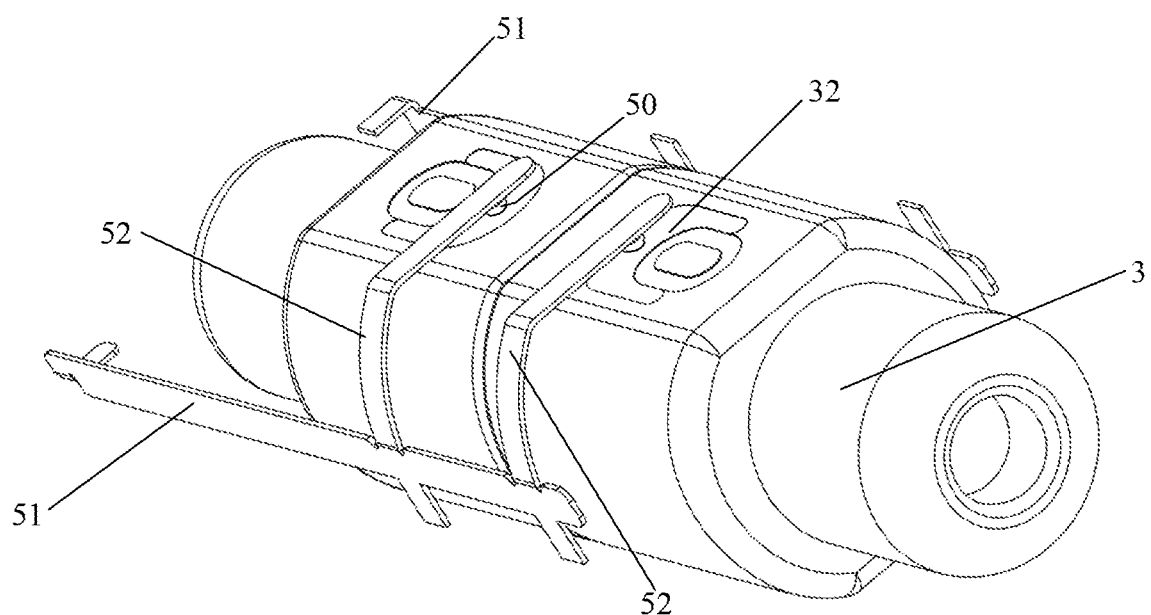
FIG. 5 is a structure view of a charging electrode and a Bluetooth earphone according to the embodiment of the present disclosure.
Figure 6:
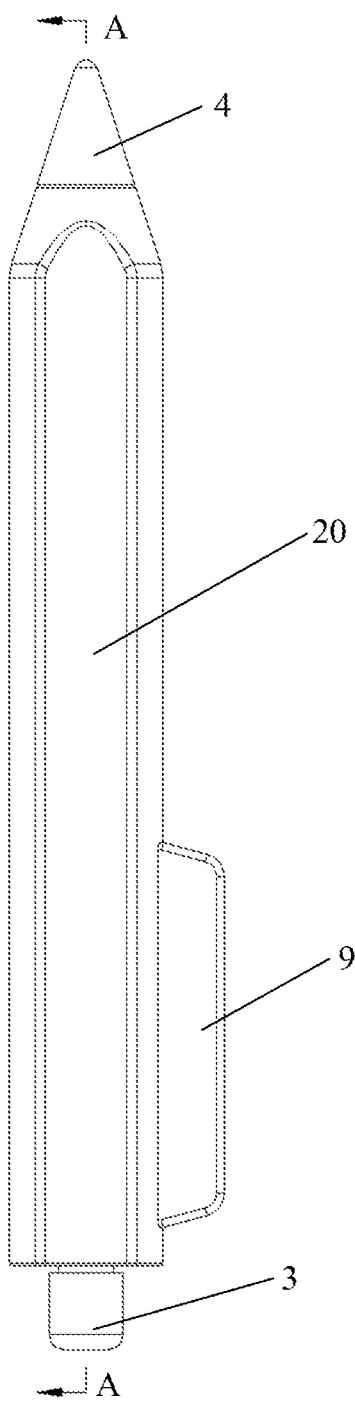
FIG. 6 is a front view of the multifunctional stylus according to the embodiment of the present disclosure.

Further, as shown in FIGS. 5 and 10, each charging electrode 5 may include a first connection portion 51 and a bent portion 52. One end of the first connection portion 51 is in electrical contact with the charging assembly 2, and the other end of the first connection portion 51 is in electrical contact with the bent portion 52. The tip of the bent portion 52 has the contact portion 50 that can be located in the charging compartment 11. Specifically, the first connection portion 51 may be disposed along a length direction of the main structure 1, and the bent portion 52 may be provided along the sidewall of the main structure 1 and perpendicular to the first connection portion 51.

Further, each charging electrode 5 may include at least one (i.e., one or more) bent portion 52 that is in electrical contact with the first connection portion 51. When each charging electrode 5 includes multiple bent portions 52, the charging compartment of the multifunctional stylus can charge multiple electronic devices, thereby further improving the utilization rate of the multifunctional stylus. FIG. 5 is a structure view of a charging electrode 5 including two bent portions 52.

Optionally, in this case, as shown in FIGS. 4 and 8, the above-described charging electrode 5 is fixed to the second cylinder 15. Specifically, the first connection portion 51 and the bent portion 52 are fixed at an outer surface of the second cylinder 15. An embedded groove (not shown) into which the first connection portion 51 is embedded and an accommodating groove 152 for accommodating the bent portion 52 are provided on the second cylinder 15. The embedded groove and the accommodating groove 152 are provided so that the charging electrode 5 is stably fixed to the second cylinder 15, thereby preventing the second cylinder 15 from moving.

Figure 11:
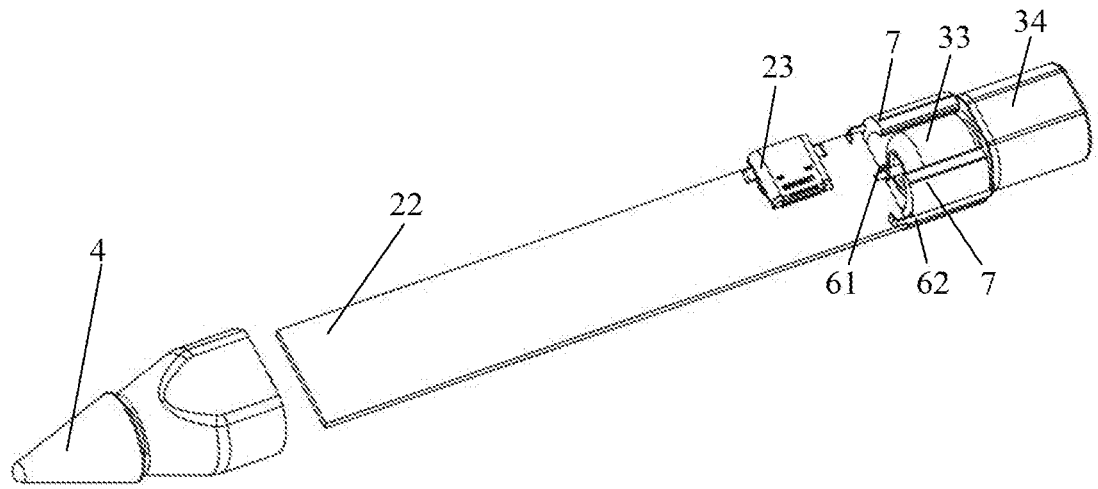
FIG. 11 is a first partial structure view of still another multifunctional stylus according to the embodiment of the present disclosure.
Figure 12:
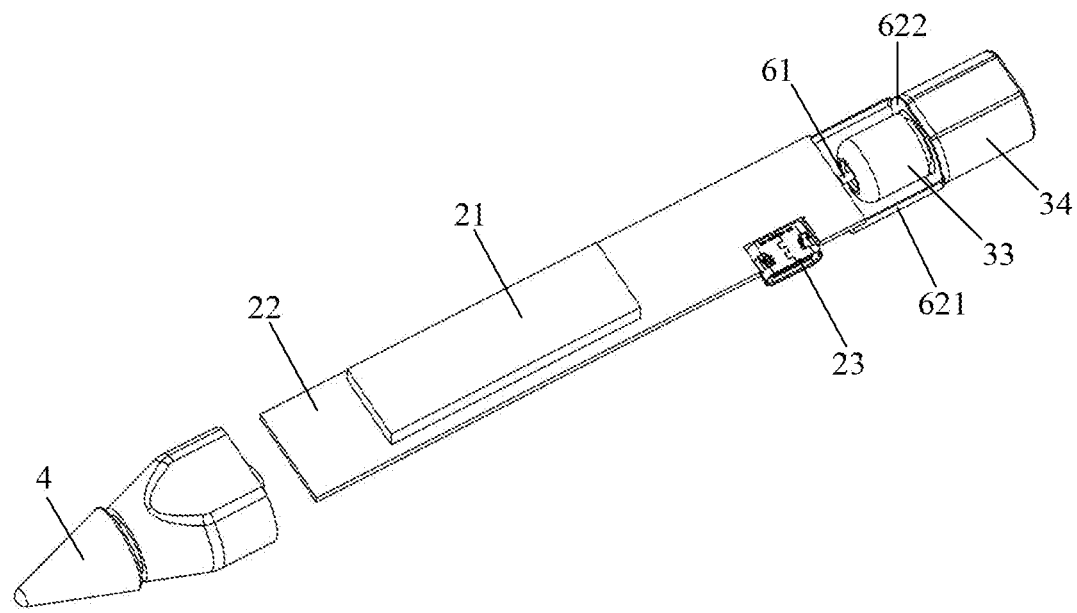
FIG. 12 is a second partial structure view of the still another multifunctional stylus according to the embodiment of the present disclosure.
Figure 13:
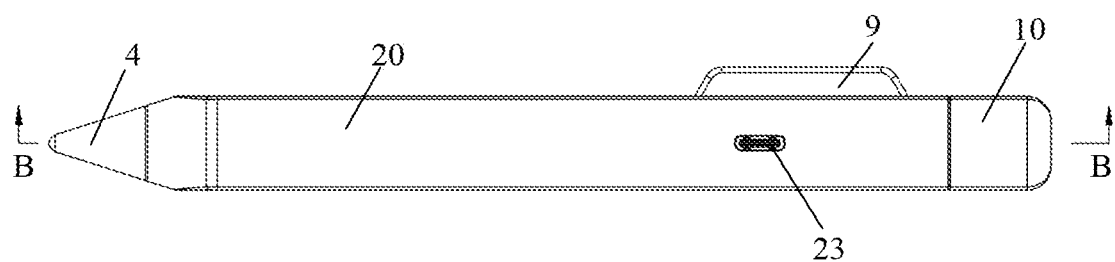
FIG. 13 is a front view of the still another multifunctional stylus according to the embodiment of the present disclosure.
Figure 14:
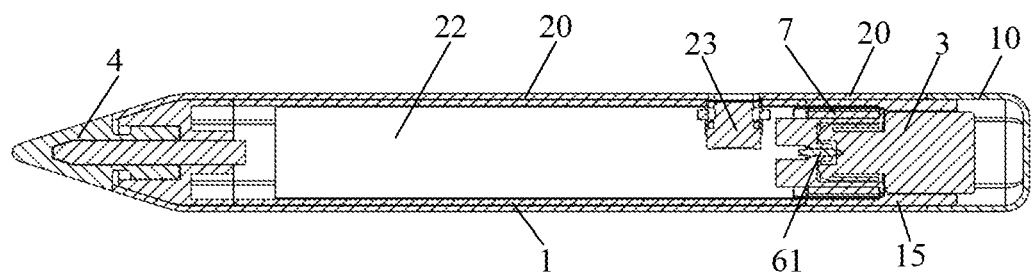
FIG. 14 is a cross-sectional view taken along a line B-B shown in FIG. 13 according to the embodiment of the present disclosure.

In the structure of the second type of charging electrode 5, as shown in FIGS. 11 and 12, the charging electrode 5 may include a second power terminal 62 and a first power terminal 61 with opposite electrical properties. That is, one of the first power terminal 61 and second power terminal 62 is positive, and the other is negative. The second power terminal 62 includes a second connection portion 621 and an annular portion 622 connected to each other, the second connection portion 621 is in electrical contact with the charging assembly 2, and the annular portion 622 is located in the charging chamber 11. One end of the first power terminal 61 is in electrical contact with the charging assembly 2, and the other end of the first power terminal 61 is located in the charging compartment 11. In this way, a charging circuit can be formed by the second power terminal 62 and the first power terminal 61.

Further, in this embodiment, the first power terminal 61 may be a probe structure, and the other end of the first power terminal 61 can be inserted into an electronic device to be in electrical contact with a charging end of the electronic device.

Thus, a multifunctional stylus with any one of the above two types of charging electrodes 5 can stably and efficiently charge an electronic device.

Further, as shown in FIG. 4 or FIG. 11, the multifunctional stylus further includes a magnetic member 7 fixed in the main structure 1. The magnetic member 7 is configured to attract the electronic device fixed in the charging compartment 11 to further improve the position stability of the electronic device in the charging compartment 11. The magnetic member 7 is provided so that the removal of the electronic device from the charging compartment 11 can be facilitated. Specifically, a groove is provided on a baffle 13 of the main structure 1, and the magnetic member 7 is located in the groove, that is, the magnetic member 7 is fixed to the partition 13 through the groove. It should be noted that the groove may form the step structure 151 described above. Optionally, as shown in FIG. 11, the multifunctional stylus may include a plurality of magnetic members 7 to further improve the force of attracting the electronic device. FIG. 11 is a structure view of a multifunctional stylus including two magnetic members 7.

In this embodiment, the main structure 1 may have at least one fixing hole, and each fixing hole has an attraction member 8 fixed therein. The attraction member 8 is configured to attract and fix the multifunctional stylus to an object (such as a metal frame or a magnetic wall) that is in contact with the multifunctional stylus. Optionally, a plurality of attraction members 8 may be located on different surfaces of the main structure 1 so that a plurality of surfaces of the main structure 1 can be attracted onto other object. For example, the attraction member 8 may be a magnet or a metal block.

In this embodiment, as shown in FIG. 12, the charging assembly 2 includes a rechargeable battery 21, a motherboard 22 in electrical contact with the rechargeable battery 21, and a charging interface 23 in electrical contact with the motherboard 22. The charging interface 23 is exposed outside the multifunctional stylus. The rechargeable battery 21 and the motherboard 22 are located in the above-described accommodating cavity 12.

Further, one end of the charging interface 23 is in electrical contact with the motherboard 22, and the other end of the charging interface 23 is fixed to the main structure 1 (as shown in FIG. 12). Specifically, a third through hole 141 through which the other end of the interface 23 passes is provided on the first cylinder 14 of the main structure 1, and in this case, the other end of the charging interface 23 is fixed to the first cylinder 14 through the third through hole 141.

Alternatively, a raised structure 9 is fixed to the main structure 1, and the charging interface 23 is fixed to the raised structure 9 (as shown in FIG. 3). Specifically, the raised structure 9 has a fourth through hole through which the other end of the charging interface 23 passes, and in this case, the other end of the charging interface 23 is fixed to the raised structure 9 through the fourth through hole.

Figure 2:
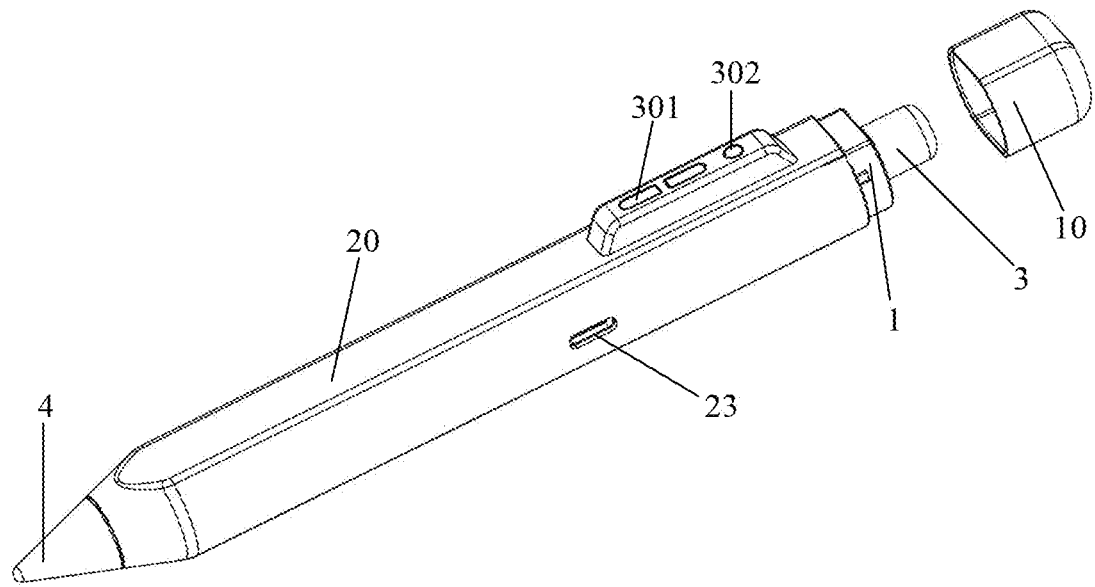
FIG. 2 is a first exploded view of the multifunctional stylus according to the embodiment of the present disclosure.

Optionally, as shown in FIG. 2, at least one button (such as a first button 301 and a second button 302 in FIG. 2) are also disposed on the raised structure 9. The at least one button can achieve electrical function switching, and may include a power switch (for example, the second button 302 shown in FIG. 2) and a switch for switching the writing function and eraser function of the stylus tip.

In this embodiment, as shown in FIG. 1, the multifunctional stylus further includes an end cover 10 detachably connected to the first end of the main structure 1 and configured to cover the charging compartment 11. The end cover 10 is configured to cover and protect the electronic device in the charging compartment 11. Moreover, the end cover 10 is provided so that dust prevention can be achieved and the electronic device can be prevented from slipping out of the charging compartment 11.

Further, with reference to FIG. 1 or FIG. 2, the multifunctional stylus further includes a casing 20 sleeved outside the main structure 1 and configured to cover and protect the electronic device.

Optionally, as shown in FIG. 3, when the multifunctional stylus includes the raised structure 9, the casing 20 has a first through hole 201 through which the raised structure 9 passes. As shown in FIG. 4, when the charging interface 23 is fixed to the main structure 1, the casing 20 further has a second through hole 203 through which the charging interface 23 passes. In addition, with reference to FIG. 3, the casing 20 may have magnetic attraction planes 202 disposed opposite to each other. In this case, an attraction member 8 on one of the magnetic attraction planes 202 of the main structure 1 can attract the multifunctional stylus to an object in contact with the multifunctional stylus through the one of the magnetic attraction planes 202.

This embodiment also provides a touch device, which includes the above-described multifunctional stylus and a Bluetooth earphone 3. The Bluetooth earphone 3 is located in the charging compartment 11 of the multifunctional stylus so that the multifunctional stylus can charge the Bluetooth earphone 3 while accommodating the Bluetooth earphone 3. That is, the above-described electronic device may be a Bluetooth earphone 3.

Optionally, when the charging electrode 5 of the multifunctional stylus has different structures, there may be multiple ways for the multifunctional stylus to charge the Bluetooth earphone 3. Exemplarily, this embodiment provides two ways to charge the Bluetooth earphone according to the above two structures of the charging electrode 5.

In one charging method, the charging electrode 5 is the above-described first structure. In this case, the charging contact 32 of the Bluetooth earphone 3 is located on the outer side of the Bluetooth earphone 3. Specifically, as shown in FIGS. 4 to 8, the Bluetooth earphone 3 may include an earphone body 31 and a charging contact 32 (shown in FIG. 4) on an outer surface of the earphone body 31. The contact portion 50 at the other end of the charging electrode 5 can make electrical contact with the charging contact 32 and charge the Bluetooth earphone 3 through the charging contact 32.

Further, when the charging electrode 5 includes two bent portions 52, the charging compartment 11 may accommodate two Bluetooth earphones 3. In this case, a contact portion 50 at the end of one bent portion 52 can make electrical contact with a charging contact 32 on one Bluetooth earphone 3 to charge the one Bluetooth earphone 3, and a contact portion 50 at the end of the other bent portion 52 can make electrical contact with a charging contact 32 on the other Bluetooth earphone 3 to charge the other Bluetooth earphone 3.

Optionally, the two Bluetooth earphones 3 are in contact along a length direction of the multifunctional stylus. As shown in FIG. 4, the two Bluetooth earphones 3 are in back contact, and a portion where one Bluetooth earphone 3 is connected to the other Bluetooth earphone 3 is a portion of a larger size. Two charging contacts 32 are provided on an earphone body 31 of each Bluetooth earphone 3 to form a loop with the two charging electrodes 5.

Alternatively, the two Bluetooth earphones 3 can be magnetically attracted together, and a force of attraction between the two Bluetooth earphones 3 is greater than a force of attraction of the two Bluetooth earphones 3 to the charging compartment 11, so that when the two Bluetooth earphones 3 needs to be taken out of the charging compartment 11, pulling one Bluetooth earphone 3 outwards can enable the other Bluetooth earphone 3 to be also pulled out, which is convenient for the two Bluetooth earphones 3 to take and place. Optionally, the attraction force of the charging compartment 11 to the two Bluetooth earphones 3 may be generated by the magnetic member 7. In this case, the attraction force between the two Bluetooth earphones 3 is greater than the attraction force of the charging compartment 11 to the two Bluetooth earphones 3.

Optionally, in another charging method, the charging electrode 5 is the above-described second structure. As shown in FIGS. 11 to 14, a Bluetooth earphone 3 includes a first portion 33 and a second portion 34 that are connected. In this case, charging contacts 32 of the Bluetooth earphone 3 are located on end faces of the Bluetooth earphone 3. The first portion 33 is in electrical contact with the charging assembly 2 through a first power terminal 61, and the second portion 34 is in electrical contact with the charging assembly 2 through a second power terminal 62, so that the charging assembly 2 charges the Bluetooth earphone 3 through the first power terminal 61 and the second power terminal 62. Optionally, as shown in FIG. 11, the second portion 34 has a cross-sectional dimension larger than a cross-sectional dimension of the first portion 33.

Further, an end face of one end of the first portion 33 of the Bluetooth earphone 3 is provided with a groove, and the other end of the above-described first power terminal 61 can make electrical contact with a charging contact 32 located at the bottom of the groove. Moreover, as shown in FIG. 12, one end of a second connection portion 621 of the second power terminal 62 is in electrical contact with the charging assembly 2, and the annular portion 622 of the second power terminal 62 can be sleeved outside the first portion 33 and make electrical contact with an end face of the second portion 34. The end face of the second portion 34 may serve as a charging contact 32 of the Bluetooth earphone 3. Optionally, an inner diameter of the annular portion 622 is larger than a cross-sectional dimension of the first portion 33 and smaller than a cross-sectional dimension of the second portion 34 so that the annular portion 622 can be sleeved outside the first portion 33 and stuck outside the second portion 34.

Optionally, the Bluetooth earphone 3 in this embodiment can be a Bluetooth wireless earphone with true wireless stereo (TWS), which can be paired with the multifunctional stylus itself, and can also be paired with other Bluetooth-enabled devices such as a mobile phone and a vehicle-mounted Bluetooth device.

The touch device provided in this embodiment not only has the function of touch control, but also has the function of charging a Bluetooth earphone 3, so that a Bluetooth earphone 3 can be placed in the charging compartment 11 in the multifunctional stylus when not in use, thereby reducing the risk of losing the Bluetooth earphone 3, enriching the functions of the touch device, improving the utilization rate of the touch device, and thus increasing the utilization value of the touch device.

The above embodiment illustrates only the basic principles and features of the present disclosure. The present disclosure is not limited by the above embodiments. Various modifications and variations made without departing from the spirit and scope of the present disclosure shall fall within the scope of the present disclosure. The scope of the present disclosure is defined by the appended claims and their equivalents.

What is claimed is:

1. A multifunctional stylus, comprising:
a main structure, an accommodating cavity being disposed in the main structure, a first end of the main structure having a charging compartment recessed inwards, and a charging electrode being disposed in the charging compartment;
a charging assembly located in the accommodating cavity, the charging assembly being in electrical contact with the charging electrode to provide electrical energy for the charging electrode; and
a stylus tip fixedly connected to a second end of the main structure,
wherein the charging electrode has a contact portion passing through a via hole on a sidewall of the main structure to enter the charging compartment, and
wherein the charging electrode comprises a first connection portion and at least one bent portion that is in electrical contact with the first connection portion, one end of the first connection portion is in electrical contact with the charging assembly, and an end of each of the at least one bent portion has the contact portion.

2. The multifunctional stylus of claim 1, further comprising a magnetic member fixed in the main structure, the magnetic member being configured to attract and fix an electronic device located in the charging compartment.

3. The multifunctional stylus of claim 2, wherein the accommodating cavity and the charging compartment are separated by a partition, and the magnetic member is fixed to the partition.

4. The multifunctional stylus of claim 1, wherein the main structure has at least one fixing hole, and an attraction member is disposed in each of the at least one fixing hole to attract and fix the multifunctional stylus to an object in contact with the multifunctional stylus.

5. The multifunctional stylus of claim 1, wherein the charging assembly comprises a rechargeable battery, a motherboard connected to the rechargeable battery, and a charging interface connected to the motherboard, the charging interface being exposed outside the multifunctional stylus.

6. The multifunctional stylus of claim 5, wherein the charging interface is fixed to the main structure; or a raised structure is fixed to the main structure, a button is disposed on the raised structure and the charging interface is fixed to the raised structure.

7. The multifunctional stylus of claim 1, further comprising an end cover detachably connected to the first end and configured to cover the charging compartment.

8. The multifunctional stylus of claim 1, further comprising a casing sleeved outside the main structure.

9. A touch device, comprising a Bluetooth earphone and the multifunctional stylus of claim 1, the Bluetooth earphone being located in the charging compartment of the multifunctional stylus.

10. The touch device of claim 9, wherein a charging contact of the Bluetooth earphone is located on an outer lateral surface or an end surface of the Bluetooth earphone.

11. The touch device of claim 10, wherein the touch device comprises two Bluetooth earphones, the two Bluetooth earphones being in contact along a length direction of the multifunctional stylus.

12. The touch device of claim 10, wherein the touch device comprises two Bluetooth earphones, the two Bluetooth earphones being magnetically attracted together, and a force of attraction between the two Bluetooth earphones being greater than a force of attraction of the two Bluetooth earphones to the charging compartment.

13. The touch device of claim 9, wherein the touch device comprises two Bluetooth earphones, the two Bluetooth earphones being in contact along a length direction of the multifunctional stylus.

14. The touch device of claim 9, wherein the touch device comprises two Bluetooth earphones, the two Bluetooth earphones being magnetically attracted together, and a force of attraction between the two Bluetooth earphones being greater than a force of attraction of the two Bluetooth earphones to the charging compartment.

15. A multifunctional stylus, comprising:
a main structure, an accommodating cavity being disposed in the main structure, a first end of the main structure having a charging compartment recessed inwards, and a charging electrode being disposed in the charging compartment;
a charging assembly located in the accommodating cavity, the charging assembly being in electrical contact with the charging electrode to provide electrical energy for the charging electrode; and
a stylus tip fixedly connected to a second end of the main structure,
wherein the charging electrode comprises a first power terminal and a second power terminal which are electrically opposite, the second power terminal comprises a second connection portion and an annular portion connected to each other, the second connection portion is in electrical contact with the charging assembly, the annular portion is located in the charging compartment, one end of the first power terminal is in electrical contact with the charging assembly, and the other end of the first power terminal is located in the charging compartment.

16. The multifunctional stylus of claim 15, further comprising a magnetic member fixed in the main structure, the magnetic member being configured to attract and fix an electronic device located in the charging compartment.

17. The multifunctional stylus of claim 15, wherein the main structure has at least one fixing hole, and an attraction member is disposed in each of the at least one fixing hole to attract and fix the multifunctional stylus to an object in contact with the multifunctional stylus.

18. The multifunctional stylus of claim 15, wherein the charging assembly comprises a rechargeable battery, a motherboard connected to the rechargeable battery, and a charging interface connected to the motherboard, the charging interface being exposed outside the multifunctional stylus.

\* \* \* \* \*